Patented Oct. 16, 1945

2,386,749

UNITED STATES PATENT OFFICE 2,386,749

LACTONES AND PROCESS OF MAKING SAME

Leopold Ruzicka, Zurich, Switzerland, assignor to Ciba Pharmaceutical Products, Incorporated, Summit, N. J., a corporation of New Jersey No Drawing. Application March 8, 1943, Serial No. 478,480. In Switzerland March 16, 1942

5 Claims. (Cl. 260—239.5)

It has been found that lactones can be obtained when saturated or unsaturated compounds of the general formula:

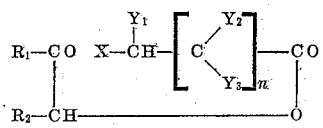

(wherein $R_1$ and $R_2$ each stand for a member of the group consisting of hydrogen and organic radicals, e. g. aliphatic, cyclo-aliphatic or aromatic, which may be connected by means of a bridge, X represents halogen, $Y_1$, $Y_2$ and $Y_3$ each stand for a member of the group consisting of hydrogen and alkyl, and $n$ has one of the values 0 and 1), are treated with metals in the presence of an inert solvent, and the condensation products obtained subjected, if desired, to dehydration and/or hydrolysis. This is a Reformatsky reaction, being a reaction between the carbonyl group, as at the left in the above formula, and the halo ester group as at the right.

The starting compounds are thus $\alpha$- or $\beta$-halogen fatty acids, e. g. chlorine, bromine or iodine derivatives of acetic acid, propionic acid, butyric acids, valeric acids, esterified with $\alpha$-ketols or $\alpha$-hydroxy-aldehydes. They can easily be prepared in an already known way, for example by the reaction of diazoketones with the fatty acids mentioned, or by esterification of the ketols or hydroxy-aldehydes with the halogenated fatty acids. Suitable diazoketones are, for example, diazo-acetone, 3-diazo-butane-2-one, diazoacetobenzene or -cyclohexane, p-hydroxy-diazoacetobenzene or -cyclohexane, 3'-diazoaceto-4-hydroxy-$\alpha,\beta$-diethyl - stilbene, 4'-diazoaceto-4-hydroxy-$\alpha,\beta$-diethylstilbene, 4' - diazoaceto - 4 - hydroxy - $\alpha,\beta$ - diethyl-dihydrostilbene, diazo-camphor, diazo-epi-camphor, $\Delta^{5,6}$-3-hydroxy-21-diazo-pregnene-20-one, diazo-progesterone, $\Delta^{5,6}$-3-hydroxy-23-diazo-nor-cholene-22-one, $\Delta^{5,6}$-3-hydroxy-25-diazo-26,27-bisnor-cholestene - 24 - one, 21-diazo allopregnene-3-ol-20-one, 21-diazo-pregnane-3-ol-20-one, $\Delta^{5,6}$-3-hydroxy-21-methyl-21-diazo-pregnene-20-one, further the corresponding esters or ethers, and derivatives substituted (for example, hydroxylated) in the 7, 12 or 14 position of the steroid nucleus. As the compounds mentioned show, the parent compounds may contain the esterified ketol group for example as a substituent attached directly to a carbon ring or to the side-chain of a carbon ring.

The following formulas illustrate the course of the reaction in the light of present day knowledge, and a method of preparation for the parent materials:

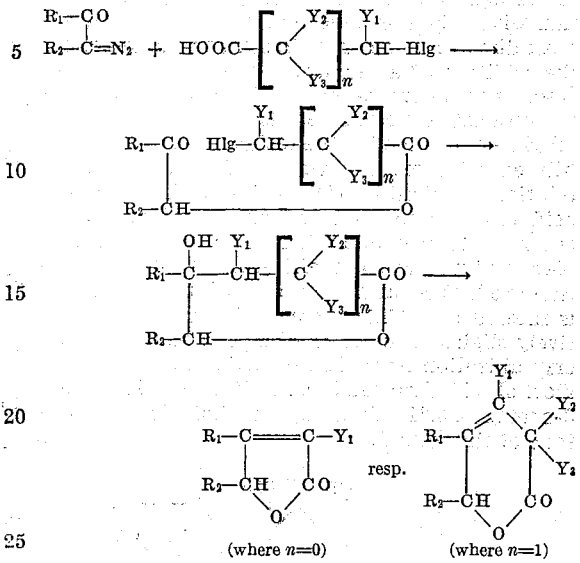

$R_1$, $R_2$, $Y_1$ to $Y_3$ and $n$ having the already mentioned significance.

As products of the condensation reaction, compounds are obtained with a 5 or 6 membered, saturated and hydroxylated lactone ring or unsaturated lactone ring. From the compounds with a 6 membered hydroxylated lactone ring, compounds with a $\gamma,\delta$ or $\alpha,\beta$-double bond can be obtained by dehydration, in addition to compounds with the $\beta,\gamma$-unsaturated lactone ring illustrated above.

The condensation is carried out in a known manner by means of metals such as zinc or magnesium, in a suitable inert solvent such as benzene, toluene, dioxane or ether. Partial dehydration generally already takes place during the condensation reaction. Mixtures are thus obtained which can be worked up without or after separation. The condensation product is then subjected, if desired, to a known method of dehydration, for which procedure treatment with fatty acid anhydrides, distillation or sublimation under reduced pressure, if required after mixing with substances which lower surface tension, such as aluminum oxide, silica gel, active charcoal, fuller's earth, or with anhydrous salts such as copper sulphate, has proved to be particularly suitable. The product of the reaction is subjected to the usual means of separation, e. g. fractional crystallization or chromatographic adsorption, in order to isolate the pure compound.

The following examples illustrate the invention but are not to be regarded as limiting it in any way:

Example 1

2.0 g. $\Delta^{5,6}$-3-acetoxy-21-bromoacetoxy-pregnene-20-one of M. Pt. 137–138° C. and specific rotation $[\alpha]_D = +22.5°$ (in chloroform) and having the formula:

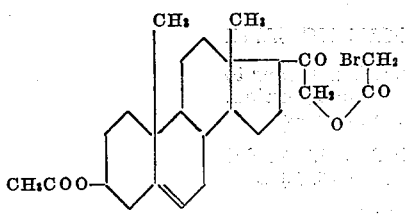

(prepared for example from $\Delta^{5,6}$-3-acetoxy-21-diazo-pregnene-20-one by causing it to react with bromoacetic acid) are dissolved in 20 cc. of absolute benzene and the solution boiled under reflux with 1.56 g. of zinc foil, until the zinc is almost dissolved. In order to start up the reaction, the addition of a few drops of bromoacetic acid is sometimes advantageous. The benzene solution is cautiously concentrated down, a little absolute ethyl alcohol added to the residue and the solution filtered off from the zinc mud. The alcoholic solution is poured into ice-cold dilute hydrochloric acid and the precipitated product dissolved in ether. The alcoholic ether layer is washed with plenty of water; the main quantity of the reaction product separates out as a white powder and is filtered off. This product, which is comparatively slightly soluble in ether can be purified by crystallization from glacial acetic acid or absolute alcohol. It then melts at 239° C. and is the $\Delta^5$-3-acetoxy-20,21-dihydroxy-norcholenic acid lactone of the formula

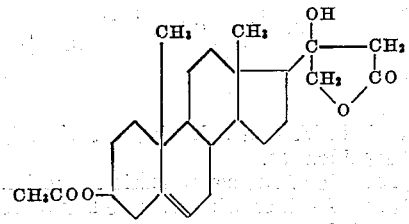

Dehydration to the corresponding unsaturated lactone is easily carried out by heating to 240° C. in vacuo. Also on longer boiling with acetic anhydride, the unsaturated lactone, namely the $\Delta^{5,6;20,22}$-3-acetoxy-21-hydroxy-norcholadienic acid lactone, M. Pt. 173–174° C., is obtained. By acid saponification the $\Delta^{5,6;20,22}$-3,21-dihydroxy-nor-choladienic acid lactone, M. Pt. 258–260° C., is obtained. It has the following formula:

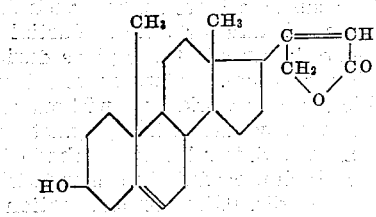

The reaction runs a similar course if ketol esters of other halogen fatty acids, e. g. $\alpha$- or $\beta$-bromopropionic acid, are used.

Example 2

4 g. of $\Delta^5$-3-acetoxy-21-bromoacetoxy-pregnene-20-one and 6 g. of zinc foil are dried in a high vacuum. 40 cc. of dioxane are then added. The reaction mixture is cautiously warmed and heated for a short time under reflux. 2 cc. of absolute alcohol are then added, and the whole boiled for 1 hour on a water-bath. 30 cc. of the solution are then distilled off, the contents of the flask dissolved in 80 cc. of absolute alcohol and filtered off from the zinc residue. The clear filtrate is concentrated down in vacuo to about 40 cc. and ether and dilute hydrochloric acid added in a separating funnel. After shaking up for a short time, a yellowish precipitate separates out from the ether solution in the form of fairly coarse granules. It is filtered off, washed first with ether until the yellow colour disappears and then with dilute hydrochloric acid and water, and finally dried in vacuo. This reaction product is then heated with acetic anhydride in pyridine for 2 hours to 60° C., whereupon the solution obtained is concentrated down and the residue chromatographed using a column of 60 g. of aluminium oxide prepared with benzene. On elution with ether the lactone of $\Delta^{5,6;20,22}$-3-acetoxy-21-hydroxy-nor-choladienic acid, M. Pt. 170–172° C., is obtained. Finally the lactone of $\Delta^{5,6}$-3-acetoxy-20,21-dihydroxy-nor-cholenic acid described in Example 1 can be eluted with acetone.

Example 3

$\Delta^{5,6}$-3-acetoxy-25-diazo-26,27-bisnor-cholestene-24-one (obtained, for example, as described in "Chemisches Zentralblatt" 1939, I, 1182, 1372) is converted, by causing to react with bromoacetic acid, into the $\Delta^{5,6}$-3-acetoxy-25-bromoacetoxy-26,27-bisnor-cholestene-24-one, M. Pt. 128–130° C., $[\alpha]_D = -35.5°$ (in CHCl$_3$), which has the formula:

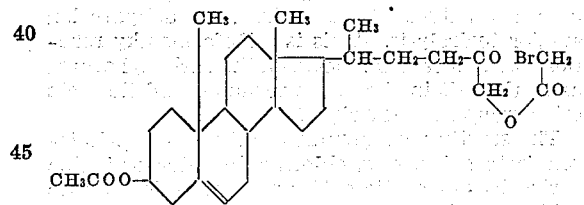

5.9 g. of this bromoacetoxy ketone and 9.5 g. of activated zinc foil are sharply dried. 80 cc. of dried benzene are then added and about one third of the solvent distilled off to dry the apparatus. There is then heated under reflux, if necessary with the addition of a few drops of bromoacetic acid, until the reaction starts. After the reaction has subsided the mixture is boiled for a short time under reflux, diluted with 150 cc. of absolute alcohol and filtered off from the unchanged zinc. 40 cc. of concentrated hydrochloric acid are added to the filtrate to complete lactonization, and the mixture warmed for a short time on a water-bath. After cooling, it is diluted in water and the product of the reaction dissolved in ether. On concentrating the ether solution down to a small volume, the greater part of the reaction mixture crystallizes out. On filtering off by suction, a product is obtained which is negative in Legal's test. It is mainly $\beta$-[$\Delta^{5,6}$-3-hydroxy-nor-cholenyl-(23)]-$\beta,\gamma$-dihydroxy-n-butyric acid-$\gamma$-lactone or its 3-monoacetate.

This crude product is boiled for several hours under reflux with 150 cc. of acetic anhydride. The reaction solution is evaporated down in vacuo, the residue boiled up with a little methyl alcohol, and the mixture again evaporated down.

The product of the reaction is dissolved in benzene and purified chromatographically. The main product obtained is Δ$^{a,\beta}$-β-[Δ$^{5,6}$-3-acetoxy-nor-cholenyl-(23)]-butenolide, which, after recrystallization from alcohol, melts at 204–205° C. and has a specific rotation of [α]$_D$=—40.5° (in chloroform).

By acid saponification Δ$^{a,\beta}$-β-[Δ$^{5,6}$-3-hydroxy-nor-cholenyl-(23)]-butenolide is obtained in a practically quantitative yield. This compound melts at 229–230° C., has a specific rotation of [α]$_D$=—42.5° (in chloroform), and possesses the following formula:

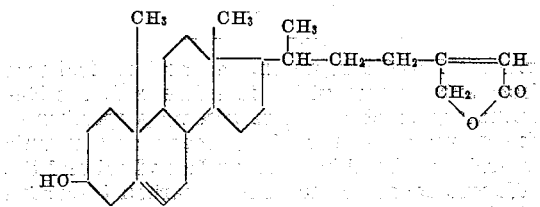

It gives a positive action to Legal's test and an absorption maximum at about 220 mμ (log=4.1).

If, instead of a bromoacetic acid ester, a bromo-propionic acid ester is used for the manufacture of the parent material, the corresponding butenolide, methylated in the α-position [M. Pt. 217–218° C., [α]$_D$=—43.8° (in CHCl$_3$)] is obtained. The acetate of this compound melts at 184–185° C. and has a specific rotation of [α]$_D$=—41.8°. α-halogen derivatives of higher fatty acids give also the corresponding α-alkylated butenolides. If, on the other hand, β-halogen fatty acid derivates are used, pentenolides are obtained.

If the reaction is started from Δ$^{5,6}$-3-acetoxy-25-bromoacetoxy-27-nor-cholestene-24-one (obtained by causing Δ$^{5,6}$-3-acetoxy-cholenic acid chloride to react with diazoethane and subsequently boiling with bromoacetic acid), analogous products are obtained, which have a methyl group in the γ-position.

*Example 4*

2 g. of Δ$^{5,6}$-3-acetoxy-23-bromacetoxy-norcholene-22-one of the formula:

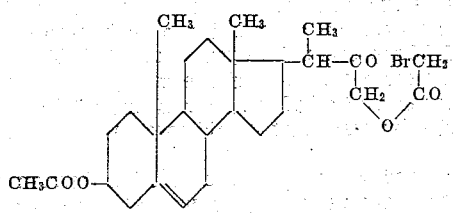

(prepared, for example, from Δ$^{5,6}$-3-acetoxy-23-diazo-nor-cholene-22-one, M. Pt. 260–265° C., by reaction with bromoacetic acid) are dissolved in 30 cc. of absolute benzene and treated with 4.0 g. of zinc-copper. Reaction soon sets in spontaneously, and after it has subsided, the mixture is heated for a short time under reflux, and then diluted with methyl alcohol. The unchanged zinc is then filtered off, the filtrate concentrated down and decomposed with aqueous hydrochloric acid. The solution obtained is boiled up for a short time and the product of the reaction dissolved in ether, after it has been allowed to cool. After the ether solution has been evaporated down, the residue is boiled for a few hours with acetic anhydride. The excess anhydride is evaporated off in vacuo, when the crude Δ$^{a,\beta}$-β[Δ$^{5,6}$-3-acetoxy-pregnenyl-(20)]-butenolide of the formula

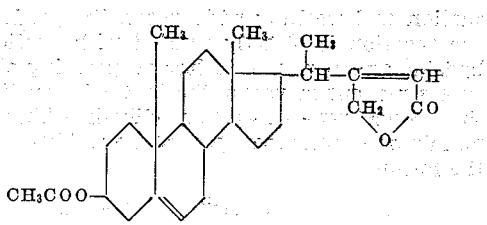

is obtained. This is then purified chromatographically and converted into the Δ$^{a,\beta}$-β-[Δ$^{5,6}$-3-hydroxy-pregnenyl-(20)]-butenolide by saponification.

*Example 5*

1 g. of 3-hydroxy-21-bromoacetoxy-pregnane-20-one (obtained by treating 21-diazo-pregnene-3-ol-20-one, M. Pt. 174–178° C., with bromoacetic acid) is rapidly dried and made to react with 1 g. of zinc filings in benzene solution. The mixture is then diluted with alcohol, filtered off hot from the unchanged zinc and the filtrate poured into 2N hydrochloric acid. The solvent is distilled off in steam and the residue dissolved in ethyl acetate. After the solvent has been evaporated off, the reaction product is acetylated with pyridine-acetic anhydride, warming moderately. The product of acylation is worked up as usual and separated chromatographically.

The benzene ether eluates contain the Δ$^{20,22}$-3-acetoxy-21-hydroxy-nor-cholenic acid lactone, which melts at 166–167° C. on recrystallization from alcohol, gives a strongly positive reaction to Legal's test and has an ultraviolet absorption, typical of α,β-unsaturated lactones (λ maximum=220mμ). By acid saponification the 14-desoxy-digitoxigenin (lactone of the Δ$^{20,22}$-3,21-dihydroxy-nor-cholenic acid), M. Pt. 225–227° C., is obtained.

The ether-acetone eluates contain the lactone of 3-acetoxy-20,21-dihydroxy-nor-cholanic acid, M. Pt. 204–207° C., which is boiled with acetic anhydride to eliminate water. The acetate of the lactone of Δ$^{20,22}$-3,21-dihydroxy-nor-cholenic acid (acetate of 14-desoxy-digitoxigenin), M. Pt. 166–167° C., thus obtained can be saponified in acid solution as described.

*Example 6*

3'-diazoaceto-4-acetoxy-α,β-diethyl-dihydrostilbene, which can be prepared in an analogous way to the corresponding stilbene compound (Nature 1941, page 595), is converted by reaction with bromoacetic acid into the corresponding ketol ester of the formula:

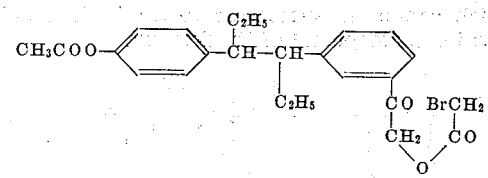

1.0 g. of this bromoaceto-ketone is dissolved in 10 cc. of absolute benzene and 750 mg. of powdered zinc-copper added. The reaction is assisted by boiling under reflux until the greater part of the zinc-copper is dissolved. The benzene is then cautiously evaporated off in vacuo, the residue dissolved in absolute alcohol, and the undissolved material separated off by filtration. The alcoholic solution is warmed for a short time with 2 cc. of concentrated hydrochloric acid and the reaction product then precipitated by the addition of plenty of water. After filtering off by suction and washing with water, the product of the reaction is directly treated with acetic anhydride and pyridine. After evaporating off the excess reagent in vacuo, the 3'-Δ^{α,β}-butenolide of the 4-acetoxy-α,β-diethyl-dihydrostilbene is mainly on chromatography of the residue. I has the formula

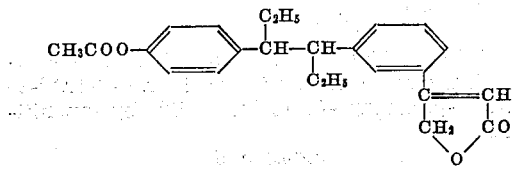

In addition the 3'-β,γ-dihydroxy-n-butyric acid-γ-lactone of the 4-acetoxy-α,β-diethyl-dihydrostilbene of the formula:

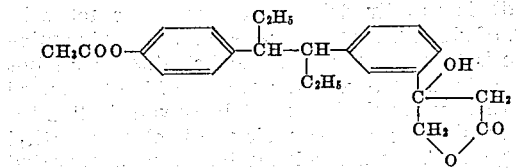

is obtained. By acid saponification the corresponding 4-hydroxy-compounds can be obtained from these two products.

What I claim is:

1. A process for the manufacture of lactones, which comprises subjecting to the Reformatsky reaction a compound of the formula

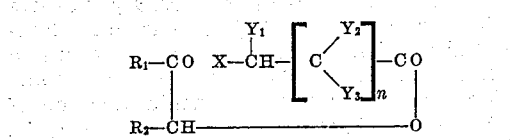

wherein $R_1$—CO represents an acyl radical free from substituents which interfere with the Reformatsky reaction, $R_2$ represents a member of the group consisting of hydrogen and organic radicals, the bond between an $R_2$ radical and the adjacent carbon atom being a carbon-to-carbon bond, X represents halogen, each of $Y_1$, $Y_2$ and $Y_3$ stands for a member of the group consisting of hydrogen and alkyl, and $n$ has one of the values 0 and 1, by reacting the said compound in an inert solvent medium with a metal in whose presence a carbonyl compound undergoes the Reformatsky reaction, whereby ring closure takes place, and a lactone is formed, and completing the reaction with the aid of a mineral acid whereby the said metal is split off in salt form from the lactone.

2. A process for the manufacture of lactones, which comprises subjecting to the Reformatsky reaction a compound of the formula

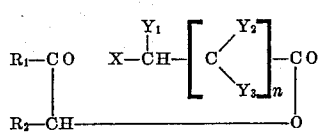

wherein $R_1$—CO represents an acyl radical free from substituents which interfere with the Reformatsky reaction, $R_2$ represents a member of the group consisting of hydrogen and organic radicals, the bond between an $R_2$ radical and the adjacent carbon atom being a carbon-to-carbon bond, X represents halogen, each of $Y_1$, $Y_2$ and $Y_3$ stands for a member of the group consisting of hydrogen and alkyl, and $n$ has one of the values 0 and 1, by reacting the said compound in an inert solvent medium with a metal in whose presence a carbonyl compound undergoes the Reformatsky reaction, whereby ring closure takes place and a lactone is formed, completing the reaction with the aid of a mineral acid whereby the said metal is split off in salt form from the lactone, and then subjecting the resultant product to a dehydrating treatment.

3. A process for the manufacture of lactones, which comprises subjecting to the Reformatsky reaction a compound of the formula

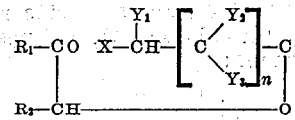

wherein $R_1$—CO represents an acyl radical free from substituents which interfere with the Reformatsky reaction, $R_2$ represents a member of the group consisting of hydrogen and organic radicals, the bond between an $R_2$ radical and the adjacent carbon atom being a carbon-to-carbon bond, X represents halogen, each of $Y_1$, $Y_2$ and $Y_3$ stands for a member of the group consisting of hydrogen and alkyl, and $n$ has one of the values 0 and 1, by reacting the said compound in an inert solvent medium with a metal in whose presence a carbonyl compound undergoes the Reformatsky reaction, whereby ring closure takes place and a lactone is formed, completing the reaction with the aid of a mineral acid whereby the said metal is split off in salt form from the lactone and then subjecting the resultant product to a hydrolyzing treatment.

4. A process for the manufacture of lactones, which comprises subjecting to the Reformatsky reaction a compound of the formula

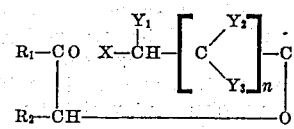

wherein $R_1$—CO represents an acyl radical free from substituents which interfere with the Reformatsky reaction, $R_2$ represents a member of the group consisting of hydrogen and organic radicals the bond between an $R_2$ radical and the adjacent carbon atom being a carbon-to-carbon bond, X represents halogen, each of $Y_1$, $Y_2$ and $Y_3$ stands for a member of the group consisting of hydrogen and alkyl, and $n$ has one of the values 0 and 1, by reacting the said compound in an inert solvent medium with a metal in whose presence a carbonyl compound undergoes the Reformatsky reaction, whereby ring closure takes place and a lactone is formed, completing the reaction with the aid of a mineral acid whereby the said metal is split off in salt form from the lactone, and subjecting the resultant product to a dehydrating and then to a hydrolyzing treatment.

5. A process for the manufacture of lactones, which comprises subjecting to the Reformatsky reaction a compound of the formula

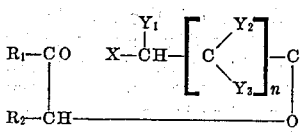

wherein $R_1$ stands for a radical containing the cyclopentanopolyhydrophenanthrene nucleus free from substituents which interfere with the Reformatsky reaction, $R_2$ represents a member of the group consisting of hydrogen and organic radicals, the bond between an $R_2$ radical and the adjacent carbon atom being a carbon-to-carbon bond, X represents halogen, each of $Y_1$, $Y_2$ and $Y_3$ stands for a member of the group consisting of hydrogen and alkyl, and $n$ has one of the values 0 and 1, by reacting the said compound in an inert solvent medium with a metal in whose presence a carbonyl compound undergoes the Reformatsky reaction, whereby ring closure takes place and a lactone is formed, and completing the reaction with the aid of a mineral acid whereby the said metal is split off in salt form from the lactone.

LEOPOLD RUZICKA.